(12) United States Patent
Boston

(10) Patent No.: US 7,914,020 B2
(45) Date of Patent: Mar. 29, 2011

(54) VEHICLE SUSPENSION SYSTEM WITH A VARIABLE CAMBER SYSTEM

(76) Inventor: Roy Boston, Geneva, IL (US)

( * ) Notice: Subject to any disclaimer, the term of this patent is extended or adjusted under 35 U.S.C. 154(b) by 123 days.

(21) Appl. No.: 12/173,509

(22) Filed: Jul. 15, 2008

(65) Prior Publication Data

US 2009/0194965 A1 Aug. 6, 2009

Related U.S. Application Data

(60) Provisional application No. 61/025,199, filed on Jan. 31, 2008.

(51) Int. Cl.
*B62D 17/00* (2006.01)
*B60G 3/18* (2006.01)

(52) U.S. Cl. ............... 280/86.751; 280/124.136

(58) Field of Classification Search ......... 280/86.75, 280/86.751, 86.752, 86.753, 86.755, 86.756, 280/86.757, 124.135, 124.136, 5.52, 5.521
See application file for complete search history.

(56) References Cited

U.S. PATENT DOCUMENTS

| | | | |
|---|---|---|---|
| 2,652,263 A * | 9/1953 | Varnum | 280/124.139 |
| 2,678,830 A | 5/1954 | Andrew et al. | |
| 2,828,969 A | 4/1958 | Hoffman | |
| 2,852,268 A * | 9/1958 | Johnson | 280/124.141 |
| 2,907,578 A | 10/1959 | Taber | |
| 3,485,506 A | 12/1969 | Melbar et al. | |
| 3,497,233 A | 2/1970 | Bolaski | |
| 3,842,698 A | 10/1974 | Fitch et al. | |
| 4,137,604 A | 2/1979 | Sandberg et al. | |
| 4,159,128 A | 6/1979 | Blaine | |
| 4,191,274 A | 3/1980 | Goldberg et al. | |
| 4,371,191 A | 2/1983 | Goldberg et al. | |
| 4,487,429 A | 12/1984 | Ruggles | |
| 4,700,972 A | 10/1987 | Young | |
| 4,796,720 A | 1/1989 | Bauer | |
| 4,971,348 A | 11/1990 | Oyama et al. | |
| 5,292,149 A | 3/1994 | Luger | |
| 5,324,056 A | 6/1994 | Orton | |
| 5,374,075 A | 12/1994 | Lee | |
| 5,499,719 A | 3/1996 | Lindee et al. | |
| 6,170,838 B1 | 1/2001 | Laurent et al. | |
| 6,511,078 B2 | 1/2003 | Sebe | |
| 6,637,758 B2 | 10/2003 | Woo | |
| 6,820,637 B1 | 11/2004 | Vertanen et al. | |
| 6,874,793 B2 | 4/2005 | Choudhery | |
| 7,111,849 B2 | 9/2006 | Yun | |
| 2005/0017471 A1 * | 1/2005 | Kim | 280/86.751 |
| 2006/0290088 A1 | 12/2006 | Luttinen et al. | |

* cited by examiner

*Primary Examiner* — Paul N Dickson
*Assistant Examiner* — Joseph Rocca
(74) *Attorney, Agent, or Firm* — Erickson Law Group, PC

(57) ABSTRACT

A suspension system for a vehicle provides a camber adjusting system that during a turn, lowers and draws inward the upper A-arm, or draws inward a strut head, which supports the outer front wheel, thereby providing more negative camber to that wheel in dynamic optimal proportion to the degree of the turn. The suspension system can be configured to remain at zero camber on the inner front wheel during the turn or can be configured to raise and move outward the upper A-arm, or move outward a strut head, which supports the inner front wheel, thereby providing more positive camber to that wheel in dynamic optimal proportion to the degree of turn.

19 Claims, 12 Drawing Sheets

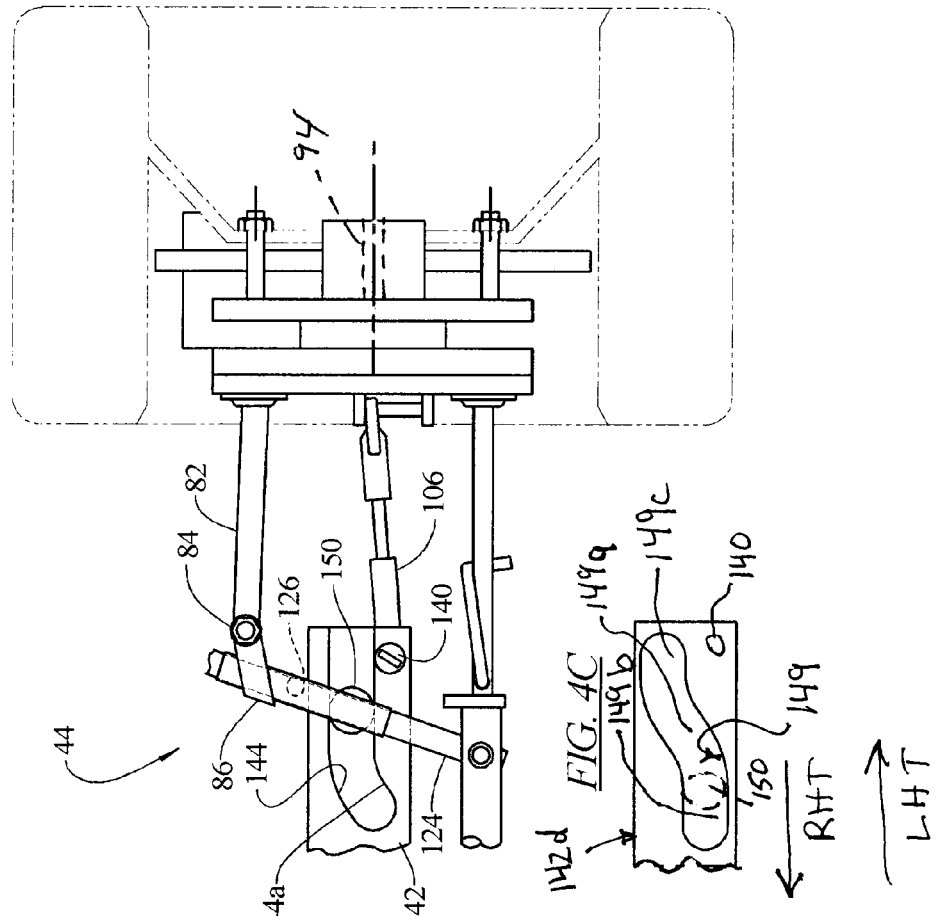

VEHICLE SUSPENSION SYSTEM WITH A VARIABLE CAMBER SYSTEM

This application claims priority of U.S. Provisional Application Ser. No. 61/025,199 filed Jan. 31, 2008.

TECHNICAL FIELD OF THE INVENTION

This invention relates to the suspension systems of land vehicles. Specifically the invention relates to the dynamic adjustment of wheel camber within a suspension system of a vehicle.

BACKGROUND OF THE INVENTION

Vehicle suspension systems must adapt from static conditions of the vehicle at rest to dynamic conditions imposed by travel on a road surface, such as road slope, pitch and turns, external forces like wind gusts, vehicle speed, and load shifts. To handle such conditions, many vehicles have pre-set, fixed suspension parameters for toe, caster, and camber.

The plane of a wheel is the plane perpendicular to the rotation axis of the wheel, passing through the center of the ground contact area of a tire. The term "camber" means the angle formed by the wheel plane relative to a line perpendicular to the ground. Camber of a wheel is also described as the vertical tilt of a wheel either toward or away from the vehicle center. A vehicle with transversely opposed wheels has negative camber when the plane of the wheel tilts outward away from the vehicle when measured at the bottom of the wheel, i.e., the bottom of the wheel is further from the vehicle center than a top of the wheel. Correspondingly, the vehicle has positive camber when the bottom of the wheel is tilted inward toward the vehicle i.e., the bottom of the wheel is nearer to the vehicle center than a top of the wheel. Changes in the camber of a wheel may be described as negative, positive or zero.

Toe is the rotation of the paired wheels either together or apart about their steering axis, that orientation being both vertical and longitudinal relative to the vehicle. A toe-in condition occurs when the fronts of the wheels are both steered inward. A toe-out condition occurs when the fronts of the wheels are both steered outward. Caster angle is the angle of a line drawn between the upper and lower ball joints between the pivot line of the tire and vertical. Caster is negative when the caster angle is >90% and positive when it is <90% when the wheel is viewed from the side.

The term "steering" means the rotation of the wheel plane about the steering axis, which is a line drawn between the upper and lower ball joints and extends to the ground as viewed from the front or rear of the vehicle. The term "roll" is the inclination of the vehicle body about a horizontal axis of the vehicle.

Changing the wheel plane determines the position of the tire on the ground and the stresses imposed on the tire. Further, it determines whether the tire is in the best position for the transmission of forces. Transverse forces are an important force determining the handling of a vehicle.

When a vehicle is steered, the centrifugal forces cause the vehicle's body to roll. When a vehicle is in a "roll" condition, centrifugal force results in a load transfer towards the outside of the curve. This causes compression of the suspension of the outer wheels and a corresponding extension of the suspension of the inner wheels. In conventional unequal length A-arm suspensions, roll imparts negative camber to the outer wheels.

The term "bump steer" is the tendency of a wheel to steer by changing toe, camber or both as it moves upwards into jounce. Generally, the tire that is outside in a turn moves outward as the suspension is compressed, and has a more negative camber. Toe changes may also result from a combination of turning and body roll. In automobiles that have independent unequal length A-arm front suspension, the geometry that controls the camber of the front wheels is a compromise between the need to minimize bump steer and camber change while in jounce modes on the one hand, and the need to create a negative camber change while the front wheels are in turning positions. Since conventional front suspension geometry is designed to compromise these two states of operation, the front wheels produce bump steer when encountering a bump through camber change. Also in a conventional unequal length independent A-arm suspension, if the vehicle's design incorporates a variable ride height, the camber changes as the ride height changes. This provides suboptimal wheel camber because the rights wheel's camber provides a left steering effect while the left wheel provides a right steering effect. Thus, as each front wheel in a currently designed unequal length a-arm suspension encounters uneven road surfaces, each wheel imparts steering effects as they travel in jounce and rebound. These actions decrease vehicle directional stability and increase tire scrub that both reduces tire life and fuel economy.

The present inventor recognizes that it is desirable to have a vehicle suspension that provides a near-zero change in wheel camber while operating in a straight ahead condition. Also, the present inventor recognizes that it is desirable to have a suspension system that dynamically varies the wheel camber during a turn to provide optimal suspension geometry for vehicle stability and performance. Further, the inventor recognizes that it is desirable to have a suspension system that optimally adjusts suspension geometry to account for variations in ride height on vehicles with variable height systems.

SUMMARY OF THE INVENTION

The present invention provides a suspension system for a vehicle that provides dynamically variable wheel camber to ensure optimal suspension geometry for vehicle stability, fuel economy, operating efficiency and performance. The present invention provides a near-zero change in wheel camber and zero change in wheel toe while operating in a straight-ahead condition. This eliminates bump steer while the vehicle is operating in a straight-ahead condition.

The invention provides for a connection between the dynamic camber variation and the vehicle's steering system. The suspension system may be operatively connected to the steering system by several means, including a horizontal guide plate, a circular guide plate, an electronic servomotor or through hydraulic operation.

When the vehicle is steered, the suspension system on the outer front wheel both lowers and draws inward the upper A-arm, or draws inward a strut head in the case of a Macpherson strut suspension, thereby reducing the camber (providing more negative camber) to that wheel in dynamic optimal proportion to the degree of the turn.

Simultaneously, when the vehicle is steered, the suspension system on the inner front wheel can be configured to remain at zero camber or can be configured to raise and move outward the upper A-arm, or move outward a strut head in the case of a Macpherson strut suspension, thereby increasing camber (providing more positive camber) to that wheel in dynamic optimal proportion to the degree of turn.

The increased negative camber on the outer wheel counteracts the centrifugal force operating on the outer wheel while in a turn and optimizes the tire contact patch on the road surface. When the vehicle body rolls in a turn, the downward slope of the upper A-arm provides additional negative camber change in the same manner as a conventional unequal-length A-arm suspension.

A further aspect of the invention is that the vehicle may incorporate a variable ride height system and the present invention eliminates any undesirable camber and toe changes caused by ride height adjustments.

The present invention enables optimal tire contact with the road and eliminates unnecessary tire scrub. It also improves stability, traction, fuel economy, and cornering performance. The present invention also provides increase of vehicle responsiveness to steering inputs because the necessary camber changes to the outside steered wheel is provided directly as a part of the operator's steering input, instead of being solely derived from body roll as in a conventional unequal length a-arm suspension design. Transient vehicle weight shifts between straight ahead and turning operations will thus be anticipated and better managed through necessary wheel camber changes. Steering response will be improved and vehicle stability will be enhanced and optimized.

Numerous other advantages and features of the present invention will become readily apparent from the following detailed description of the invention and the embodiments thereof, and from the accompanying drawings.

BRIEF DESCRIPTION OF THE DRAWINGS

FIG. 4 is an enlarged, diagrammatic fragmentary front view of a portion of the steering and suspension system of FIG. 3 with the right wheel steered straight forward;

FIG. 5 is an enlarged, diagrammatic fragmentary front view of a portion of the steering and suspension system of FIG. 3 with the right wheel steered to the left in FIG. 1;

DETAILED DESCRIPTION OF THE PREFERRED EMBODIMENTS

Figure 1:
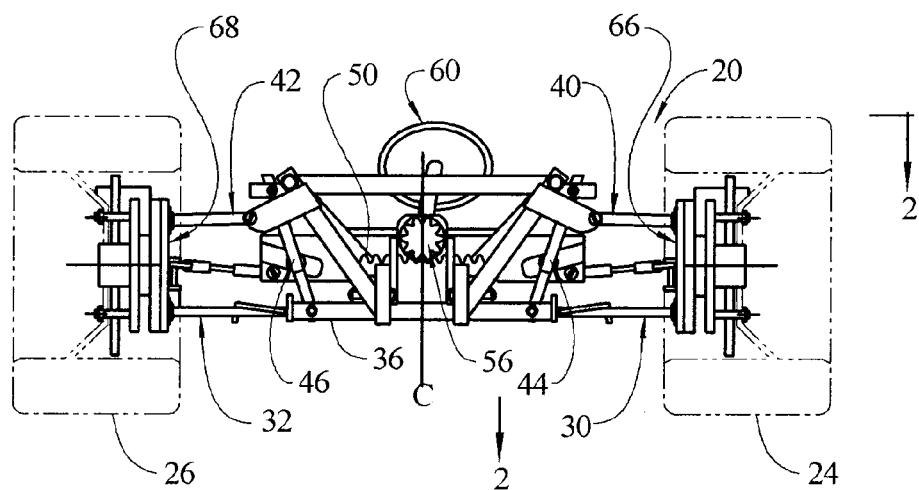
FIG. 1 is a simplified, diagrammatic front view of an automobile steering and suspension system.

While this invention is susceptible of embodiment in many different forms, there are shown in the drawings, and will be described herein in detail, specific embodiments of the invention with the understanding that the present disclosure is to be considered as an exemplification of the principles of the invention and is not intended to limit the invention to the specific embodiments illustrated.

FIG. 1 illustrates an automobile suspension and steering system 20 according to the invention, viewing the vehicle in the forward oncoming direction. The system includes: front wheels 24, 26 (including tires), lower A-arms 30, 32 connected to a vehicle frame or chassis 36, upper A-arms 40, 42 connected to the frame 36 and to camber adjustment mechanisms 44, 46, and a steering rack 50 driven by a steering gear arrangement 56 that is controlled by a steering wheel. The upper A-arm 40 is connected to the lower A-arm 30 by a hub carrier 66 that also mounts the wheel 24. The upper A-arm 42 is connected to the lower A-arm 32 by a hub carrier 68 that also mounts the wheel 26. The hub carriers 66, 68 form turnable wheel supports. Other components normally associated with a steering and suspension system such as springs and shock absorbers or struts are not shown in the simplified drawing, for clarity. The wheels 24, 26 in FIG. 1 are shown in a straight ahead steering angle.

FIGS. 2-7 illustrate and the corresponding text only describes the driver's side of the suspension and steering system 20 of FIG. 1 including alternate embodiments. It is to be understood that the passenger side of the system 20 is mirror image identical about a longitudinal, vertical center plane "C" of the chassis, so no detailed description of the passenger's side is necessary.

Figure 2:
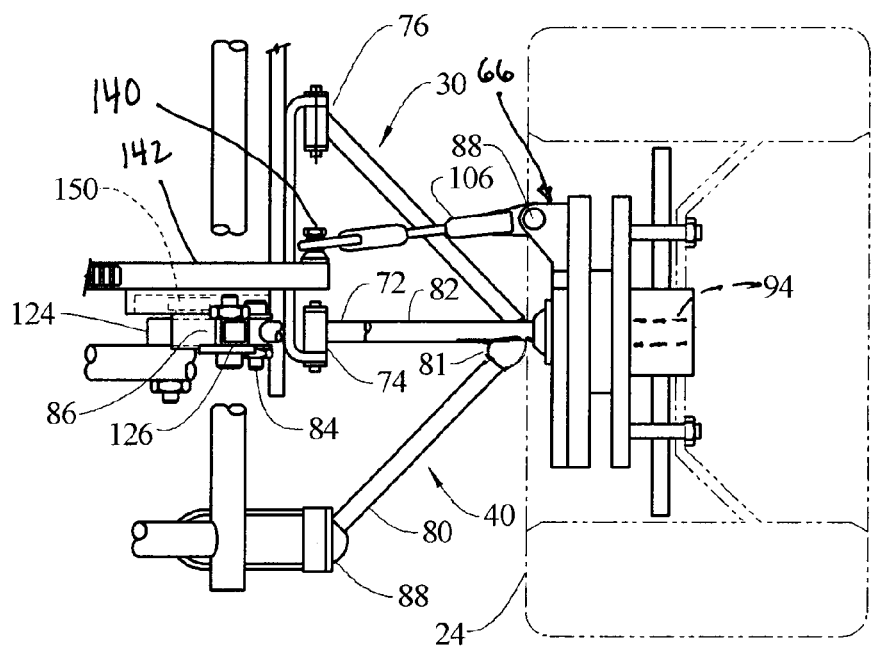
FIG. 2 is a fragmentary diagrammatic sectional view taken generally along line 2-2 of FIG. 1 of the right side of the steering and suspension system of FIG. 1, with two alternate joint configurations.
Figure 3:
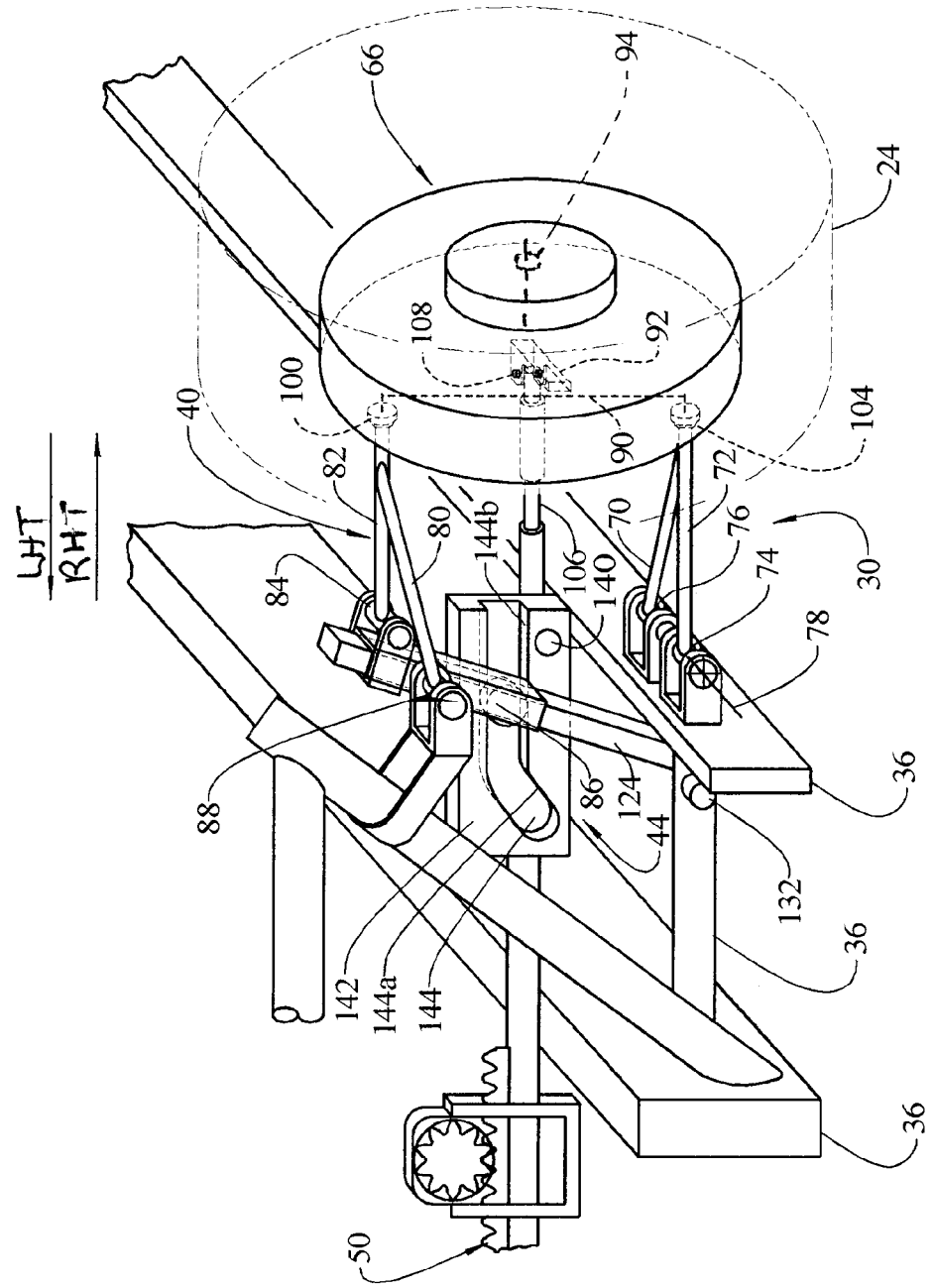
FIG. 3 is a fragmentary diagrammatic perspective view of a right side of the steering and suspension system of FIG. 1.

The lower A-arm 30 is shown in FIGS. 2 and 3 and comprises a connecting arm 70 attached to a main arm 72 at an acute angle. The main arm 72 is connected to the chassis 36 at a pivot connection 74. The connecting arm 72 connects to a vehicle chassis 36 at a pivot connection 76. The pivot connections 74, 76 are arranged along a common pivot axis 78 and allow the lower A-arm to pivot upward and downward in an arc.

The upper A-arm 40 comprises a connecting arm 80 attached by a weld joint 81 to a main arm 82 at an acute angle. The main arm 82 is connected at a pivot connection 84 to a slide mount 86 of the camber adjustment mechanism 44. The connecting arm 80 is connected to the chassis 36 at a pivot connection 88. The upper A-arm 40 and the lower A-arm 30 are effectively considered "equal length" A-arms.

It is also possible that the connection 81 can be a ball joint connection and the connection 88 can be a ball joint connection if an increased flexibility is needed. These alternate joints are shown in FIG. 2.

The hub carrier 66 comprises a substantially vertical link 90, a tie rod link 92 and a wheel hub spindle 94. The hub carrier 66 is attached at a top end of the substantially vertical link 90 to the upper A-arm main arm 82 at a ball joint connection 100. The hub carrier 66 is attached at a bottom end of the substantially vertical link 90 to the lower A-arm main arm 72 at a ball joint connection 104. The hub carrier 66 is attached at the free end of tie rod link 92 to a tie rod 106 at a ball joint connection 108. The wheel 24 is rotationally attached to the wheel hub spindle 94 by a known configuration of parts such as a hub, lugs and lug nuts, wheel bearing, washers, a nut and a cotter pin and other associated hardware.

The slide mount 86 is guided by a guide rod 124 that freely penetrates through a guide rod slot 126 through the slide mount 86. The guide rod 124 is attached to the chassis 36 at an upper attachment point 130 and a lower attachment point 132. The upper and lower attachment points 130, 132 are in different vertical planes such that the guide rod is tilted from being perpendicular to the roadway, i.e., as the guide rod 124 extends upward it is tilted laterally outward. The lower attachment point 132 is disposed closer than the upper attachment point 130 to the center plane "C" of the chassis, shown as the "C" axis in FIG. 1.

The tie rod 106 is connected at a ball joint connection 140 to a guide plate 142. The guide plate 142 includes a guide groove or cam groove 144 open facing the slide mount 86. The slide mount 86 has a guide plate roller or follower 150. The follower 150 fits within the groove 144 of the guide plate. The guide plate 142 is disposed horizontally in the chassis 36 and is attached to, or formed with, the steering rack 50 of the vehicle's steering mechanism.

FIGS. 1-5 show the present invention embodied in a front suspension system when viewing the vehicle in the forward oncoming direction. In this embodiment when the vehicle transitions from a straight operating condition to a right turn (from the driver's perspective) condition, the guide plate 142 moves in the "RHT" direction, as shown in FIGS. 3 and 5, by force from the steering rack 50, with respect to the chassis. This movement pushes the tie rod 106 in the RHT direction, thereby rotating the hub carrier 66 about the ball joint connections 100, 104.

As the guide plate 142 moves, the guide plate follower 150 slides or rolls within and along the guide plate groove 144. As the guide plate 142 moves in the RHT direction, the guide plate button 150 is forced downward by the downward turned portion 144*a* of the guide plate groove 144. The guide plate follower 150 thereby moves the slide mount 86 in a downward and laterally inward direction due to the angle of inclination of the guide rod 124. The slide mount 86 moves the main arm 82 of the upper A-arm 40 downward and also inward toward the chassis center plane "C". The connections of the upper A-arm allow both vertical and horizontal movement of the upper A-arm. The downward and inward movement of the upper A-arm creates a negative camber change to that wheel 24 with respect to the road surface.

If the guide plate 142 moves in the direction LHT in FIG. 3 for a left hand turn, the guide plate follower 150 moves within the guide plate groove 144, particularly through a flat portion 144*b* of the groove 144. The flat portion of the groove ensures a zero camber of the inside wheel of a turning vehicle. The inside wheel is unloaded during a cornering maneuver so a positive camber may not be necessary on the inside wheel.

Figure 3A:
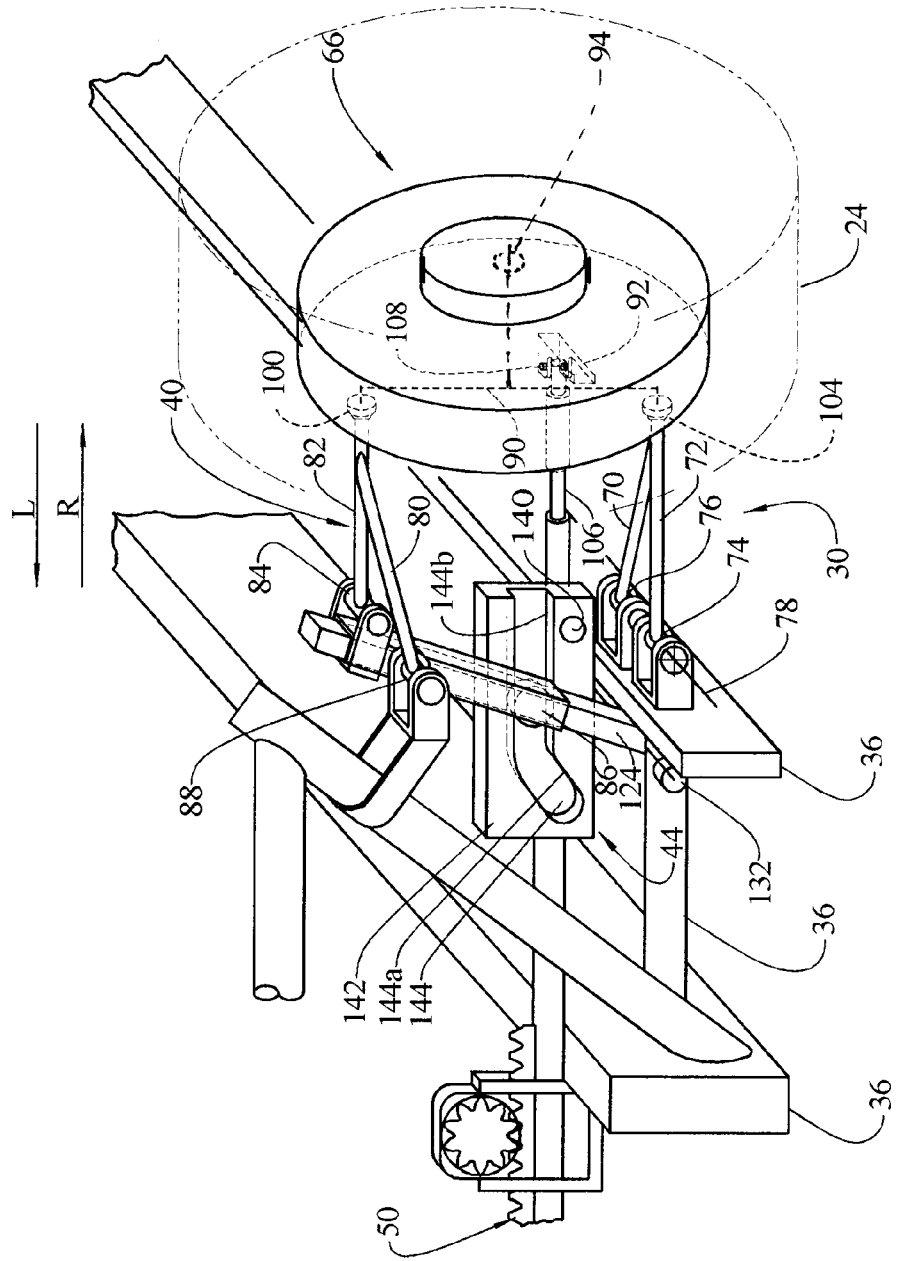
FIG. 3A is a fragmentary diagrammatic perspective view of a right side of the steering and suspension system of FIG. 1, showing an alternate configuration.

FIG. 3A illustrates a modified version of the arrangement shown in FIG. 3 wherein the steering rack 50 is lowered and attached to an elongated slide mount 86'. The tie rods 106 are also lowered as are the tie rod links 92. The connection 84 remains the elevated. The configuration of FIG. 3A works essentially the same as the configuration of FIG. 3. There may be operational advantages to the relative lowered location of the steering rack shown in FIG. 3A.

FIGS. 4 and 5 demonstrate the geometry of the camber adjusting mechanism. FIG. 4 shows the guide plate 142 in a position corresponding to a straight ahead steering of the wheel 24. The follower 150 is in the flat portion 144*b* of the groove 144. As shown in FIG. 5, the guide plate 142 has been translated to the right in the direction RHT. The down turned portion 144*a* of the groove 144 has forced the follower 150 downward and inward such that the connection 84 of the upper A-arm main arm 82 has been lowered by "h" and moved inward by "w" from the dashed line position to the solid line position. These movements create a desirable negative camber at the outside wheel 24 of the right hand turning vehicle.

Figure 4A:
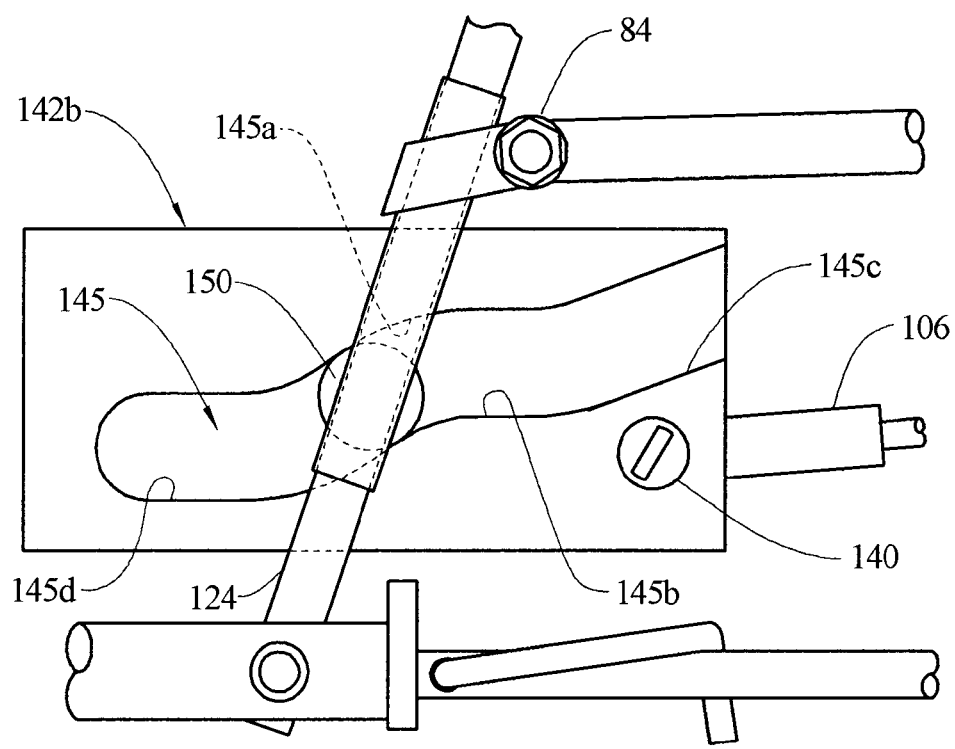
FIG. 4A is an alternate embodiment of the assembly shown in FIG. 4.

FIG. 4A shows an alternate embodiment demonstrate the geometry of the camber adjusting mechanism. An alternate guide plate 142*b* has a guide groove or cam groove 145. The guide groove 145 includes a downturned portion 145*a*, a short flat portion 145*b*, a rising portion 145*c* and a longer flat portion 145*d*. FIG. 4A shows the guide plate 142*b* in a position corresponding to a straight ahead steering of the wheel 24. The follower 150 is in the flat portion 145*b* of the groove 144. The downturned portion 145*a* corresponds to a right turn for negative camber of the driver's side front wheel and the rising portion 145*c* corresponds to a positive camber of the driver's side front wheel. The flat portion 145*d* corresponds to a region where no further camber change is desired.

FIG. 4B illustrates a simplified profile of a guide slot or cam slot 147 in a modified guide plate 142*c*. The continuous rising slot profile changes smoothly between a negative camber and a positive camber depending on the degree of turning of the wheel. Thus, as the guide plate moves in the L direction when the vehicle makes a left hand turn, the guide plate button 150 can be forced upward by a rising guide groove 147. The guide plate follower 150 thereby moves the slide mount 86 in an upward and outward direction along the guide rod 124. The slide mount 86 moves the main arm 82 of the upper A-arm upward and also outward, away from the center plane "C". The upward and outward movement creates a positive camber change to that wheel with respect to the road surface. As the wheel 24 is the inside wheel in a left turn (driver's perspective), a positive camber is desirable.

FIG. 4C shows a further alternate guide plate 142*d* having a guide groove or cam groove 149 that has a central inclined region 149*a* to effect a negative camber when the guide plate is moved in the direction RHT for a right hand turn and a flat region 149*b* where no further camber decrease is desired. The cam groove 149 includes a flat region 149*c* where no increased camber is desired given a LHT turning direction.

Figure 6:
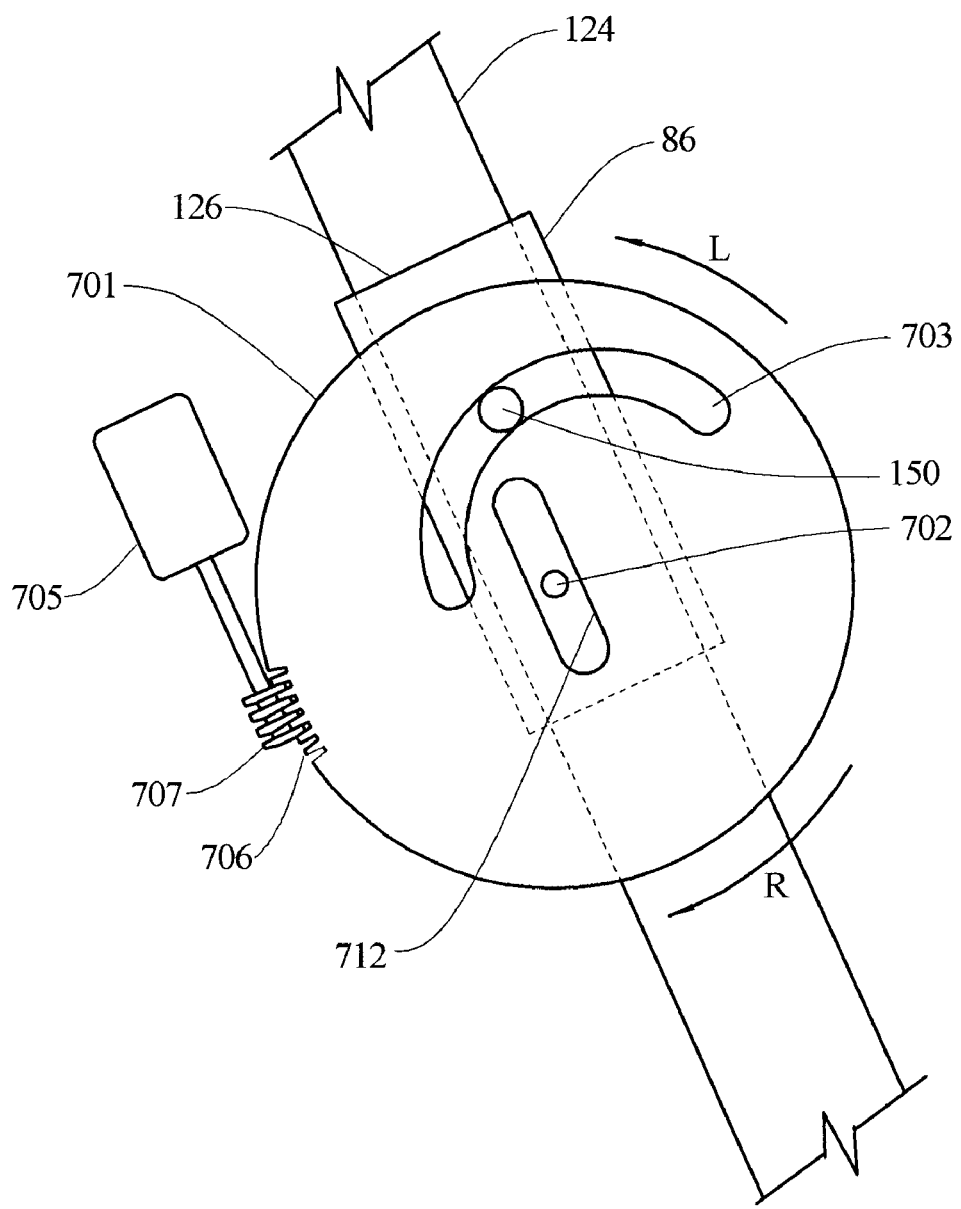
FIG. 6 is a diagrammatic fragmentary rear view of a right side of FIG. 1 but showing a guide disk of an alternate embodiment of the invention.
Figure 7:
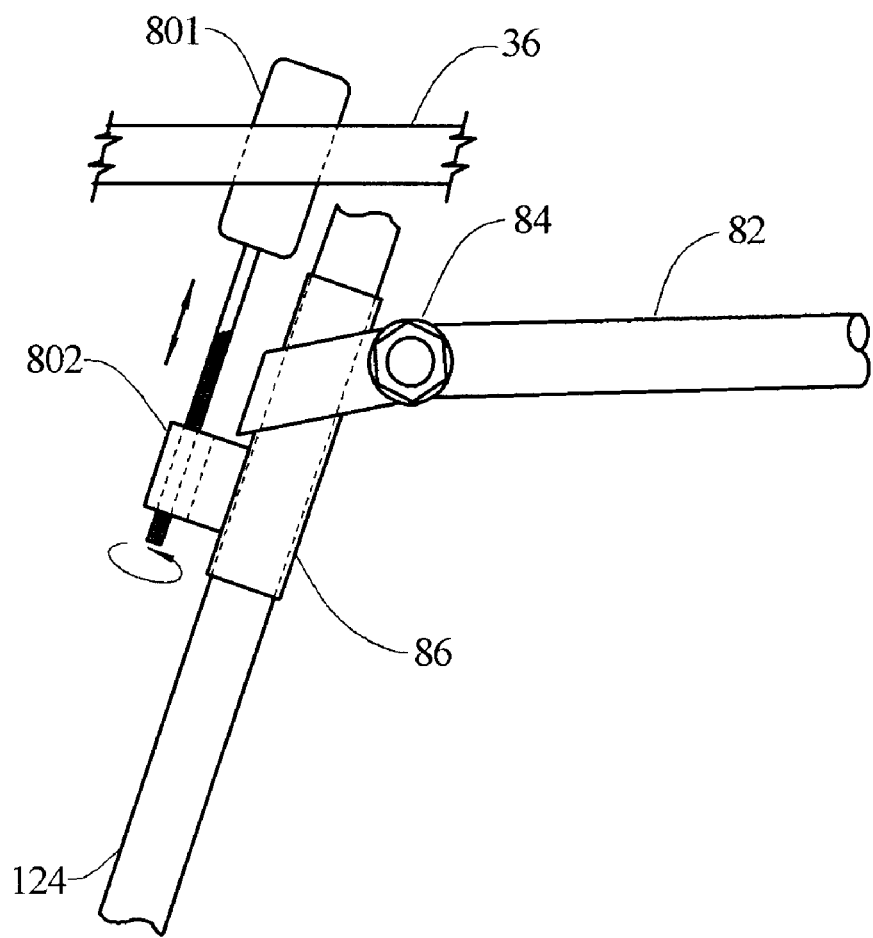
FIG. 7 is a diagrammatic perspective view of an electronic servomotor and a guide carrier of a further alternate embodiment of the invention.
Figure 8:
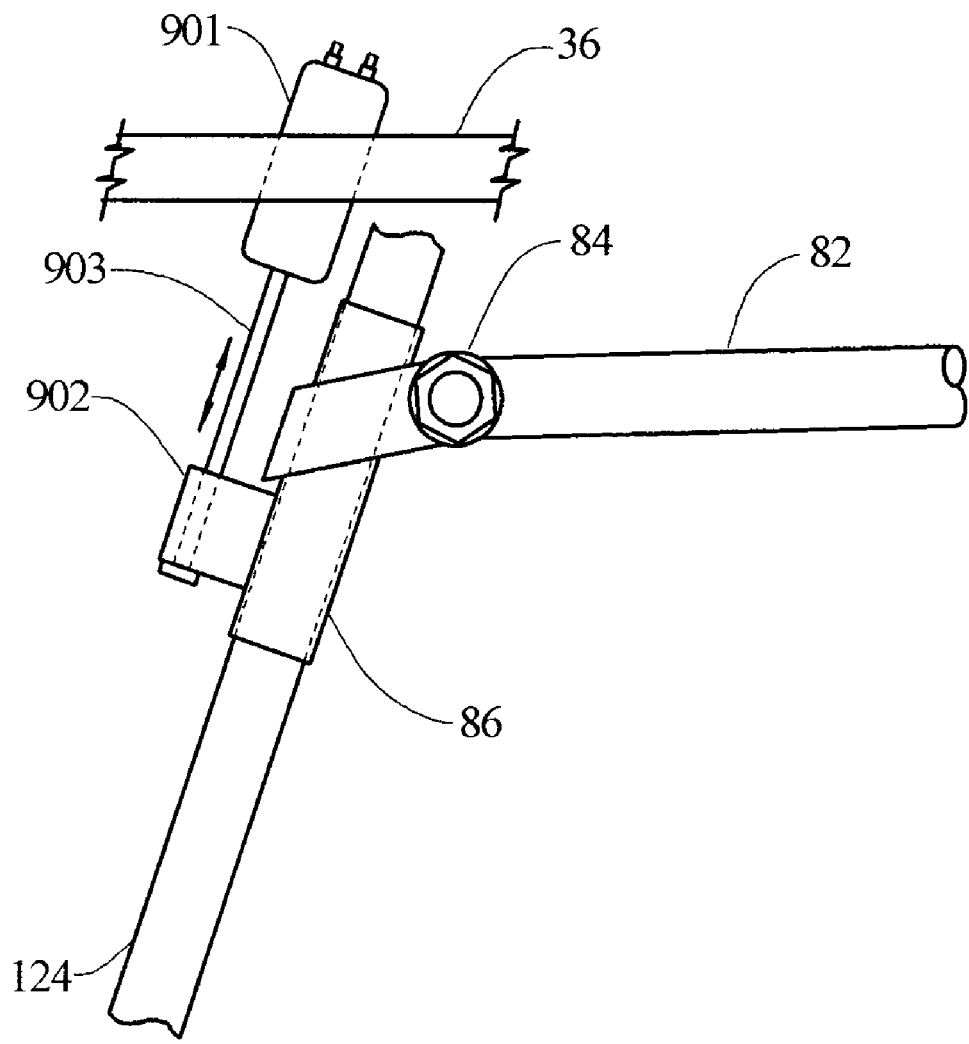
FIG. 8 is a diagrammatic perspective of a hydraulically operated additional alternate embodiment of the invention.

FIG. 6 shows an alternative embodiment of the invention, wherein a circular guide disk 701 may be substituted for the guide plate 142. The guide disk 701 has a guide disk groove 703 and is rotationally mounted to the guide rod 124 by a pin 702 or other rotary attachment. The guide disk 701 is operatively connected to and is rotated by the vehicle's steering mechanism. This can be accomplished by a variety of mechanisms such as a motor 705 driving a worm gear 707 that engages circumferential gear teeth 706 on the disk 701. The motor 705 can be a precision controlled motor such as a servomotor that is controlled by electronics of the steering system.

As the wheel hub 66 moves into a right turning condition, the guide disk 701 turns in the "R" direction, and the guide plate follower 150 moves within a guide disk groove 703. As the guide disk 701 rotates in the "R" direction, the guide plate follower 150 is forced downward and also inward toward the center plane "C" by the guide disk groove 703. The guide plate follower 150 thereby moves the slide mount 86 in a downward direction. The slide mount 86 can include a slot 712 that allows relative sliding movement of the slide mount 86 and the pin 702 which penetrates the slot 712. The slide mount 86 is guided for downward and inward movement along the guide rod 124 sliding within the guide rod slot 126. The slide mount 86 moves the main arm 82 of the upper A-arm 40 downward and also inward toward the chassis center. The ball joint attachment of the upper A-arm allows both vertical and horizontal movement of the upper A-arm. The downward and inward movement creates a negative camber change to that wheel in orientation to the road surface.

As the wheel hub moves into a left turning condition, the guide plate follower 150 moves within the guide disk groove 703. As the guide disk 701 rotates in the "L" direction, the guide plate follower 150 is forced upward by the guide disk groove. The guide plate follower 150 thereby moves the slide mount 86 in an upward direction. The slide mount 86 is guided upward and outward along the guide rod 124 at the guide rod slot 126. The slide mount 86 moves the main arm 82 of the upper A-arm upward and also outward, away from the chassis center plane "C". The upward and outward movement creates a positive camber change to that wheel with respect to the road surface. As the wheel 24 is the inside wheel in a left turn (driver's perspective), a positive camber is desirable.

In yet another embodiment of the present invention, an electronic servomotor 801 and a screw drive connecting assembly 802 could be substituted for the guide plate 142. In this embodiment the servo motor 801 is controlled by an electronic system that is connected to the vehicle's steering mechanism. The servomotor 801 is secured to the vehicle chassis 36. As the steering wheel moves into a right turning condition, the servomotor 801 rotates and moves the screw drive connecting assembly so as to lower and move inward the slide mount 86. The slide mount 86 is guided downward and inward along the guide rod 124 at the guide rod slot 126. The slide mount moves the main arm 82 of the upper A-arm 40 downward and also inward toward the chassis center. The ball joint connections of the upper A-arm 40 allow both vertical and horizontal movement of the upper A-arm. The downward and inward movement creates a negative camber change to that wheel in orientation to the road surface.

As the wheel hub moves into a left turning condition, the servomotor 801 rotates and moves the connecting assembly so as to raise and move outward the slide mount 86. The slide mount 86 is guided upward and outward along the guide rod 124 at the guide rod slot 126. The slide mount 86 moves the main arm 82 of the upper A-arm upward and also outward, away from the chassis center plane "C". The upward and outward movement creates a positive camber change to that wheel with respect to the road surface. As the wheel 24 is the inside wheel in a left turn (driver's perspective), a positive camber is desirable.

In a further embodiment of the present invention, a hydraulic actuator 901 and connecting assembly 902 could be substituted for the guide plate 142. In this embodiment the hydraulic pressure to the actuator 901 is controlled by an electronic system that is connected to the vehicle's steering mechanism. The actuator 901 is secured to the vehicle chassis 36. As the steering wheel moves into a right turning condition, the actuator 901 causes a rod 903 to extend. The rod 903 is fixed to a lug or other connection to the slide mount 86 so as to lower and move inward the slide mount 86. The slide mount 86 is guided downward and inward along the guide rod 124 at the guide rod slot 126. The slide mount moves the main arm 82 of the upper A-arm 40 downward and also inward toward the chassis center. The ball joint connections of the upper A-arm 40 allow both vertical and horizontal movement of the upper A-arm. The downward and inward movement creates a negative camber change to that wheel in orientation to the road surface.

As the wheel hub moves into a left turning condition, the actuator 901 retract the rod 903 and moves the connecting assembly 902 so as to raise and move outward the slide mount 86. The slide mount 86 is guided upward and outward along the guide rod 124 at the guide rod slot 126. The slide mount 86 moves the main arm 82 of the upper A-arm upward and also outward, away from the chassis center plane "C". The upward and outward movement creates a positive camber change to that wheel with respect to the road surface. As the wheel 24 is the inside wheel in a left turn (driver's perspective), a positive camber is desirable.

When the vehicle is operating in a straight-ahead condition, the suspension system maintains a desirable constant zero camber condition when the suspension encounters a bump in the roadway.

FIG. 9 through 12 illustrate, in schematic fashion, a further embodiment of the invention applicable to Macpherson strut type suspensions.

Figure 9:
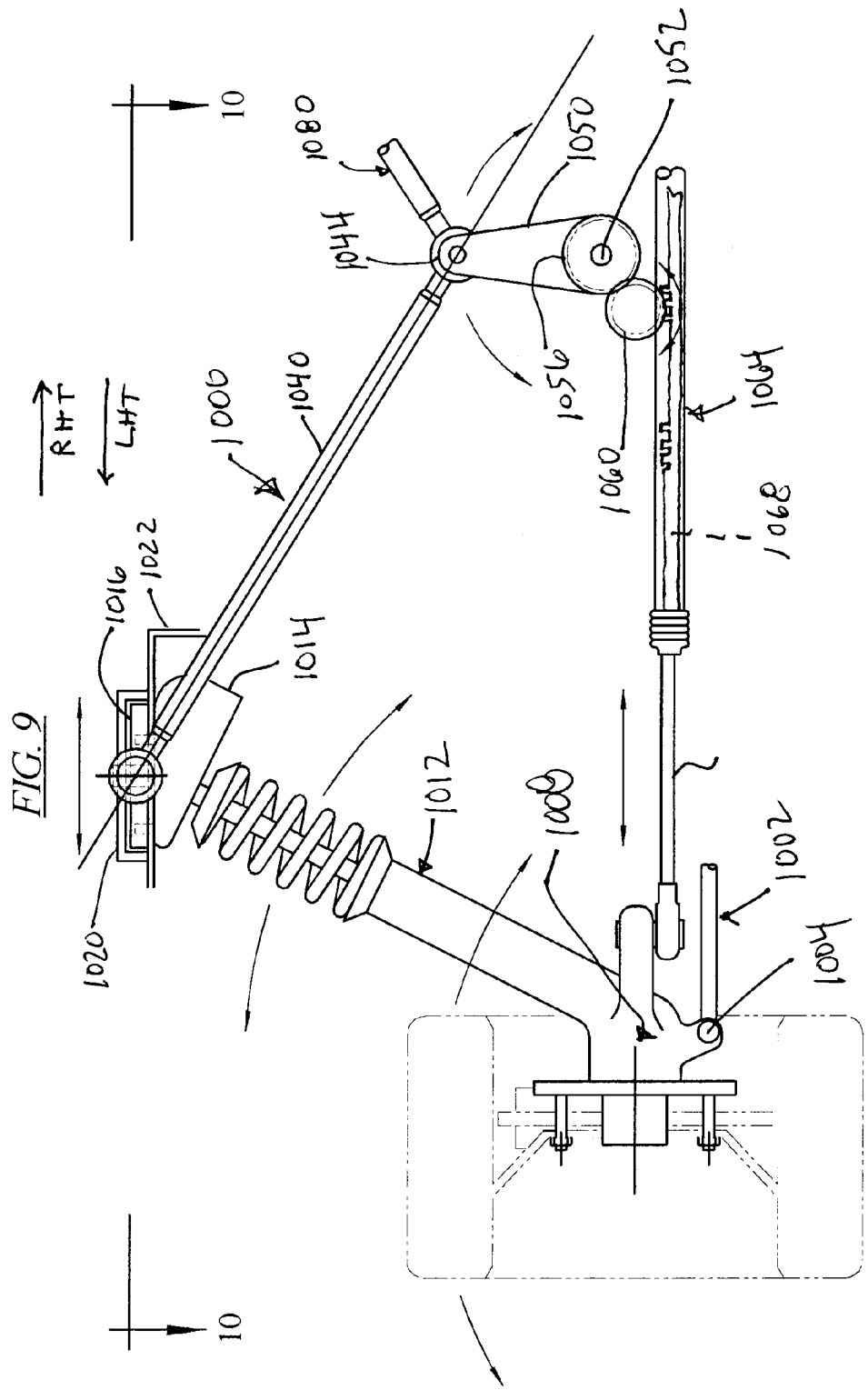
FIG. 9 is a fragmentary, diagrammatic simplified rear view of an alternate embodiment steering system taken along line 9-9 of FIG. 10.
Figure 10:
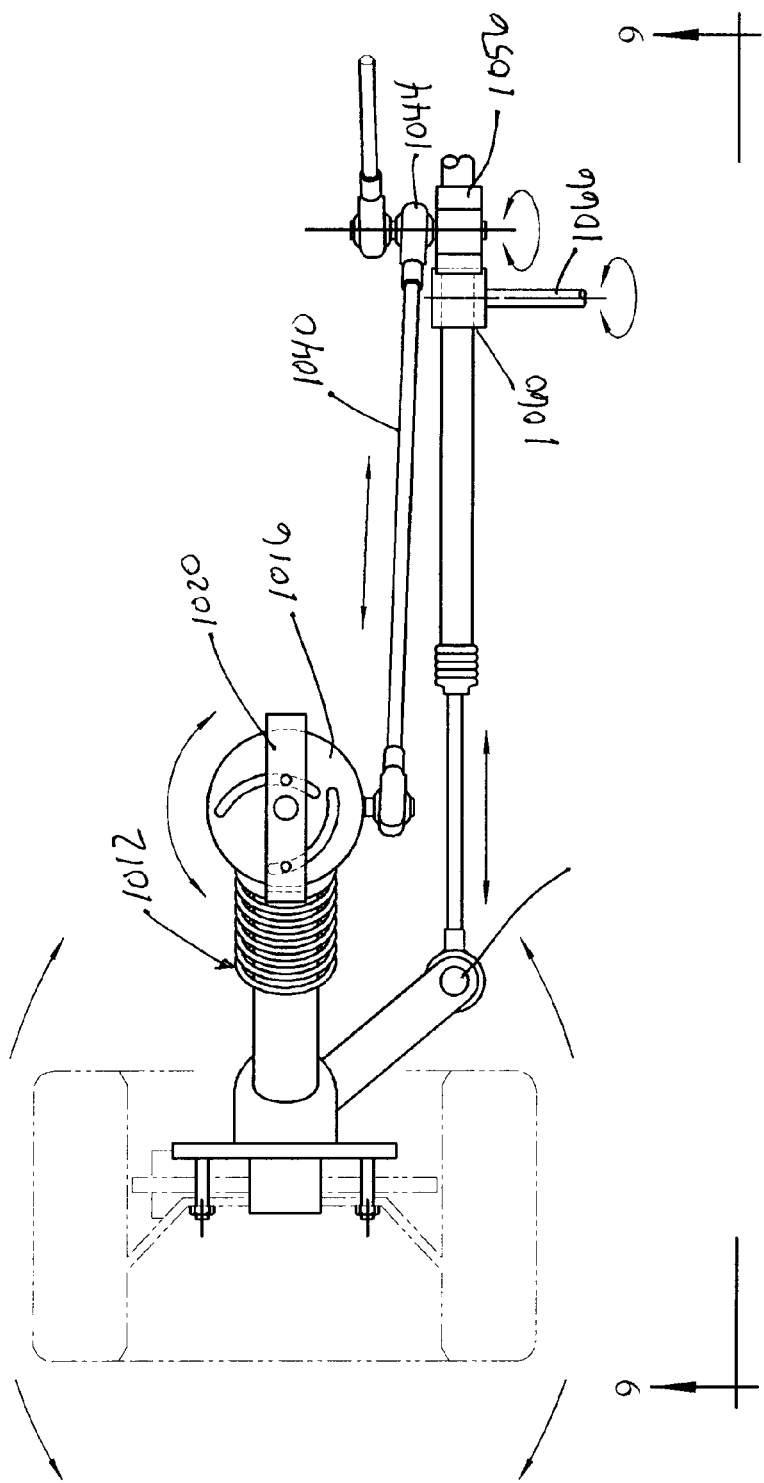
FIG. 10 is a fragmentary, diagrammatic simplified plan view of the steering system of FIG. 9 taken along line 10-10 of FIG. 9.
Figure 11:
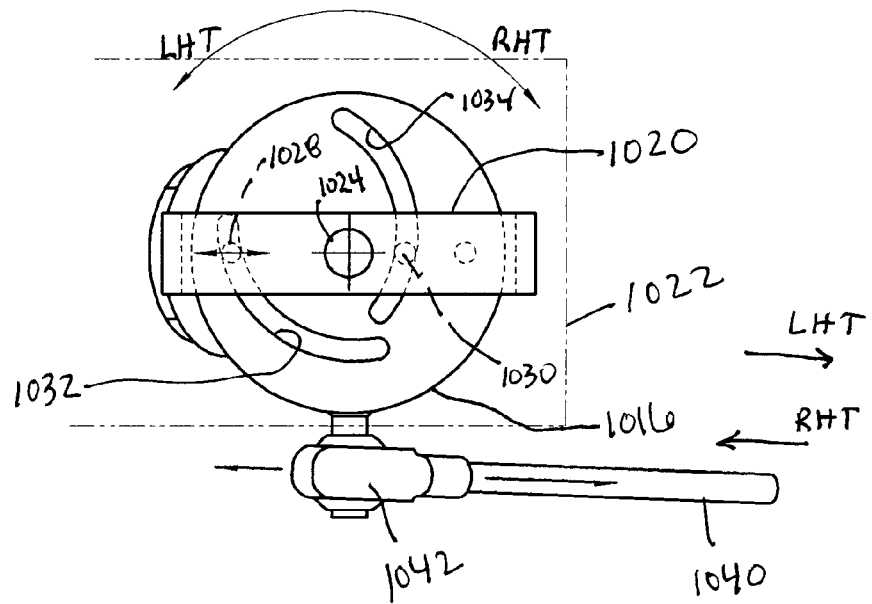
FIG. 11 is an enlarged fragmentary view taken from FIG. 10.
Figure 12:
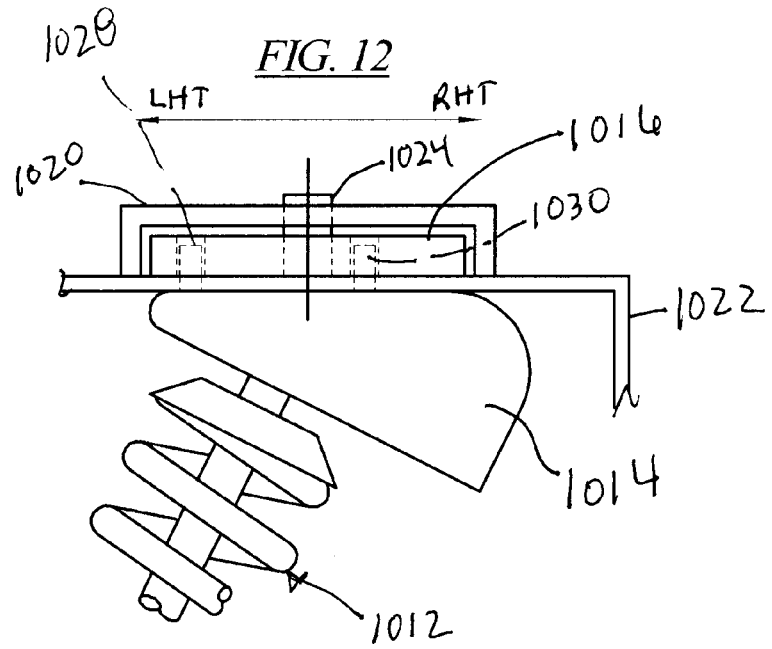
FIG. 12 is a fragmentary, schematic sectional view taken generally along line 12-12 of FIG. 11.

The driver's side (U.S. models) of a steering system 1000 is shown in FIG. 9 with the understanding that the passenger's side would be mirror image identical. The system 1000 includes a control arm 1002 that is connected at one end, via a ball joint 1004, to a hub carrier or steering knuckle 1008 and at another end to the vehicle frame by pivotal joints as known (not shown). The steering knuckle 1008 mounts a Macpherson strut and spring assembly 1012. The strut and spring assembly 1012 includes a strut head 1014 that is restrained at a top thereof by a mount plate 1016. The mount 1016 is pivotally attached to the between an upper plate 1020 and a lower plate 1022 of the vehicle frame by a pin 1024. The strut head 1014 has two protruding pins 1028, 1030 which are closely captured within curved slots 1032, 1034 provided in the mount 1016.

A camber adjusting rod 1040 is connected via a ball joint 1042 to the mount plate 1016 at one end and at an opposite end via a ball joint 1044 to a camber lever 1050. The camber lever 1050 is pivotally mounted at a pin 1052 to the vehicle frame and fixed to a gear 1056. The gear 1056 is enmesh with a pinion gear 1060 of a rack and pinion steering system 1064 that is turned by the steering shaft 1066 that is turned by the steering wheel. Turning of the steering pinion gear 1060 by the steering shaft 1066 will translate the steering rack 1068 which will translate the tie rod 1070, which will turn the steering knuckle 1008 to turn the steerable wheels. Turning of the steering pinion gear 1060 by the steering shaft 1066 will also translate both camber adjusting rods 1040, 1080 in opposite directions. Translating the camber adjusting rods will cause the mounts 1016, (passenger's side not shown) to rotate about respective center pins 1024, (passenger's side not shown).

The strut head 1014 has two protruding pins 1028, 1030 which are closely captured within curved slots 1032, 1034 provided in the mount 1016.

The cam slots 1032, 1034 are shaped and oriented such that turning of the mount 1016 is a selected rotational direction will either draw the protruding pins 1028, 1030 and the strut head 1014 inward toward the vehicle centerline or push the strut head 1014 outward away from the vehicle centerline. The movement of the strut head inward effects a negative camber of that wheel and movement of the strut head outward effects a positive camber for that wheel. According to the embodiment for a right hand turn, the outside wheel (driver's side wheel in the U.S.) will assume a negative camber and the inside wheel (passenger's side wheel in the U.S.) will assume zero camber or a positive camber depending on the design of the shape of the cam slots 1032, 1034.

Figure 13:
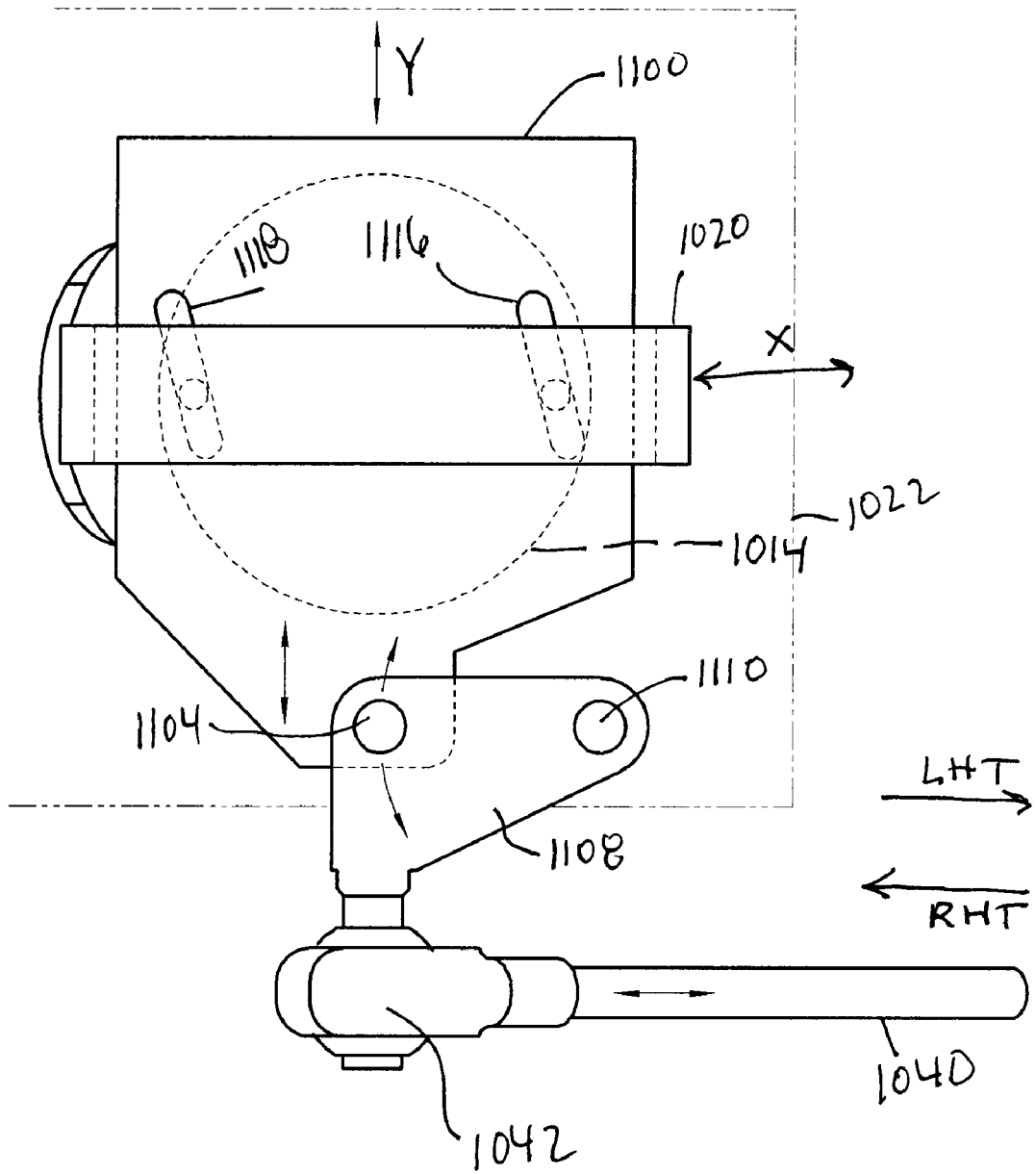
FIG. 13 is an enlarged, schematic fragmentary view of an alternate embodiment to that shown in FIG. 11.

FIG. 13 describes a further embodiment wherein an alternate mount plate 1100 does not rotate about a center pin but instead translates along a direction Y that is parallel to a longitudinal axis of the vehicle, i.e., up and down in the plane of FIG. 13. The mount plate 1100 is pinned at a first pin 1104 to a bell crank plate 1108. The bell crank plate 1108 is pinned at a second pin 1110 to the vehicle frame 1022. The camber adjusting rod 1040 is connected to the plate 1108 via the ball joint 1042. Translation of the camber adjusting rod 1040 causes the bell crank plate 1108 to rotate about the second pin 1110 which causes translation of the mount plate 1100 along the direction Y. The protruding pins 1028, 1030 are arranged to be received into angular cam slots or guide slots 1116, 1118 formed into the mount plate 1100 such that movement of the mount plate 1100 in the direction Y will shift the protruding pins 1028, 1030 and thus the strut head 1014 along the direction X to effect either a positive or negative camber of the respective wheel depending on the steering direction.

While the particular preferred and alternative embodiments to the present invention have been disclosed, it will be appreciated that many various modification and extensions of the above described technology may be implemented using the teaching of this invention.

The invention claimed is:

1. A steering system for a vehicle, comprising:
    a vehicle frame;
    a driver steering control;
    a steering unit receiving input from said driver steering control and outputting movement to a guide plate in a selected lateral direction in proportion to movement of the driver steering control;
    a first pair of wheels;
    a pair of spindles;
    a pair of cam arrangements;
    a pair of vertical members pivotally carried by said frame and each vertical member operatively connected via one of said cam arrangements to said guide plate;
    a pair of tie rod links;
    each wheel mounted on one of said spindles, each spindle mounted to one of said vertical members and one of said tie rod links, movement of said tie rod links rotates said spindles to rotate said wheels about substantially vertical axes to effect a vehicle turning movement, rotation of said vertical members about substantially horizontal axes causes camber change to said wheels, wherein
    said tie rod links are operatively connected to said guide plate and each vertical member is operatively connected to said guide plate via said cam arrangements to turn said vertical members about said substantially horizontal axes in a preset proportion to the amount of turning of said spindles about said substantially vertical axes.

2. The steering system according to claim 1, wherein each said vertical member is connected to said frame via a lower arm and an upper arm that are pivotally connected to said frame, and said cam arrangement is provided between said upper arm and said guide plate.

3. The steering system according to claim 2, wherein said frame comprises a pair of guide rods fixed in an inclined orientation and each cam arrangement comprises a slide mount slidable on a respective guide rod along a length of said guide rod, wherein each said slide mount comprises a follower and said guide plate comprises a cam track for guiding said cam follower, each said upper arm pivotally connected to one of said slide mounts.

4. The steering system according to claim 3, wherein said upper and lower arms comprise equal length A arms.

5. The steering system according to claim 3, wherein each of said cam tracks includes an outwardly rising portion and said guide rods are inclined in an outwardly rising direction.

6. The steering system according to claim 1, wherein said driver steering control comprises a steering wheel and said steering unit comprises a pinion and a rack, said pinion transferring rotary power from said steering wheel to translate said rack in a selected transverse direction, said rack being connected to or formed with said guide plate.

7. The steering system according to claim 1, wherein opposite sides of said steering system are mirror image identical across a vertical, longitudinal center plane.

8. The steering system according to claim 1, comprising a second pair of wheels, said second pair of wheels being mounted spaced from said first pair of wheels, said second pair of wheels being mounted to said frame by wheel supports having camber adjusting mechanisms coordinated in movement with movement of said guide plate during steering.

9. A steering system in a vehicle having a pair of turnable wheel supports for mounting a pair of steerable wheels to a vehicle frame, comprising:
    a driver steering device;
    a steering member arranged to move laterally by input from said driver steering device;
    said steering member operatively connected to the pair of turnable wheel supports to turn said front wheels about vertical axes;
    a cam arrangement connected to said steering member and to said turnable wheel supports, said cam arrangement having a pair of cam surfaces that are configured to adjust camber of said steerable wheels in proportion to the amount of turning of said steerable wheels, wherein during steering an inside wheel increases in camber and an outside wheel decreases in camber.

10. The steering system according to claim 9, wherein said cam arrangement comprises a pair of cam grooves having said pair of cam surfaces, each of which receives a follower.

11. The steering system according to claim 9, wherein said steering member comprises a moveable plate and a pair of movable camber links connected to said turnable wheel supports at a vertical distance from an axis of rotation of said steerable wheels on said turnable wheel supports, movement of said movable camber links changing the camber of said steerable wheels.

12. The steering system according to claim 9, wherein said steering member comprises a pair of movable steering links connected to said turnable wheel supports each at a horizontal distance from an axis of rotation of each of said wheels, movement of said movable steering links changing the turning angle of said steerable wheels.

13. A steering system in a vehicle having a pair of turnable wheel supports for mounting a pair of steerable wheels to a vehicle frame, comprising:
    a driver steering device;
    a steering member arranged to move laterally by input from said driver steering device;
    said steering member operatively connected to the pair of turnable wheel supports to turn said front wheels about vertical axes;
    a cam arrangement connected to said steering member and to said turnable wheel supports, said cam arrangement configured to adjust camber of said steerable wheels in proportion to the amount of turning of said steerable wheels, wherein during steering an inside wheel increases in camber and an outside wheel decreases in camber;
    wherein said steering member comprises a moveable plate and a pair of movable camber links connected to said turnable wheel supports at a vertical distance from an axis of rotation of said steerable wheels on said turnable wheel supports, movement of said movable camber links changing the camber of said steerable wheels, wherein said steering member comprises a sliding connection between said movable link and said movable plate, wherein an end of said movable link at said sliding connection moves in part inwardly when said movable plate moves transversely.

14. The steering system according to claim 9, wherein said turnable wheel supports comprise strut suspension elements mechanically connected to said steering member and movable at the top mounting thereof by said steering member to adjust the camber of said turnable wheels in proportion to the degree of turning.

15. A steering mechanism for a vehicle having a pair of steerable wheels, said wheels being carried by turnable wheel supports pivotally mounted to the vehicle frame, the turnable wheel supports being pivoted to turn the vehicle, comprising:
   a driver-controlled steering element;
   a laterally movable elongated steering member operatively connected between the turnable wheel supports and operatively connected to the steering element for turning the turnable wheel supports to turn the vehicle by the steering member shifting laterally; and
   a direct mechanical linkage between the wheel supports and the steering member to adjust the camber of the wheels proportionally to the degree of turning of the wheels, wherein said direct mechanical linkage comprises at least one cam surface applied between said steering member and at least one of the turnable wheel supports.

16. The steering mechanism according to claim 15, wherein said direct mechanical linkage comprises at least one follower in a cam groove having said cam surface, applied between said elongated steering member and at least one turnable wheel support.

17. The steering mechanism according to claim 16, wherein said cam groove comprises an angular cam groove.

18. The steering mechanism according to claim 16, wherein said cam groove comprises a curved cam groove.

19. The steering system according to claim 15, comprising a second pair of wheels, said second pair of wheels being mounted spaced from said pair of steerable wheels, said second pair of wheels being mounted to said vehicle frame by wheel supports connected to camber adjusting mechanisms, said camber adjusting mechanisms adjusting camber of said second pair of wheels coordinated in adjustment with movement of said elongated steering member during steering.

* * * * *